United States Patent
Shum et al.

(10) Patent No.: US 7,363,399 B2
(45) Date of Patent: Apr. 22, 2008

(54) METHOD, APPARATUS AND COMPUTER PROGRAM PRODUCT PROVIDING STORAGE NETWORK DYNAMIC TUNING OF I/O FLOW WITH QUEUE DEPTH

(75) Inventors: Che Lui Shum, San Jose, CA (US); Limei Shaw, San Jose, CA (US); Lucy Ya Mei Kung, Milpitas, CA (US); Rong Zeng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 11/206,938

(22) Filed: Aug. 17, 2005

(65) Prior Publication Data
US 2007/0043854 A1 Feb. 22, 2007

(51) Int. Cl.
*G06F 3/00* (2006.01)
(52) U.S. Cl. ............................ 710/52; 710/36; 710/39; 711/156; 711/167; 310/229; 310/231; 310/232; 310/395.21
(58) Field of Classification Search .................. 710/52
See application file for complete search history.

(56) References Cited

U.S. PATENT DOCUMENTS

| | | | |
|---|---|---|---|
| 5,680,539 A | 10/1997 | Jones | 395/182.04 |
| 6,105,122 A | 8/2000 | Muller et al. | 712/1 |
| 6,170,042 B1 | 1/2001 | Gaertner et al. | 711/158 |
| 6,636,909 B1 | 10/2003 | Kahn et al. | 710/60 |
| 6,711,137 B1 | 3/2004 | Klassen et al. | 370/252 |
| 7,242,960 B2 * | 7/2007 | van Rooyen | 455/552.1 |
| 2003/0067903 A1 | 4/2003 | Jorgensen | 370/338 |
| 2003/0126233 A1 | 7/2003 | Bryers et al. | 709/219 |
| 2003/0204687 A1 | 10/2003 | Hyde, II et al. | 711/158 |
| 2004/0194095 A1 | 9/2004 | Lumb et al. | 718/100 |
| 2004/0244007 A1 | 12/2004 | Garza et al. | 718/105 |
| 2004/0267951 A1 * | 12/2004 | Hattori | 709/231 |
| 2005/0021879 A1 | 1/2005 | Douglas | 710/5 |
| 2006/0215782 A1 * | 9/2006 | Ahmed et al. | 375/272 |
| 2006/0280119 A1 * | 12/2006 | Karamanolis et al. | 370/229 |

FOREIGN PATENT DOCUMENTS

WO WO-2004/025902 A2 3/2004

* cited by examiner

*Primary Examiner*—Niketa Patel
(74) *Attorney, Agent, or Firm*—Harrington & Smith, PC

(57) ABSTRACT

In accordance with a computer program product, apparatus and a method there is provided a redundant network wherein a host computer operates with a plurality of storage devices by monitoring conditions of the multipath storage network and controlling a storage multipath device driver in conjunction with an associated storage multipath device input/output (I/O) pending queue to increase I/O throughput to a storage device driver, such as a disk device driver, when I/O demand increases, and to decrease I/O throughput to the storage device driver in the event of an I/O error condition.

12 Claims, 2 Drawing Sheets

METHOD, APPARATUS AND COMPUTER PROGRAM PRODUCT PROVIDING STORAGE NETWORK DYNAMIC TUNING OF I/O FLOW WITH QUEUE DEPTH

TECHNICAL FIELD

These teachings relate generally to data storage networks, systems and methods and, more specifically, relate to data queue management apparatus and methods that are useful in a storage area network (SAN) type architecture.

BACKGROUND

It is common practice for a data storage device, such as a disk-based data storage device, to have a recommended value on the number of requests that it can handle under good conditions and under error conditions. This value is typically referred to as a Queue Depth, and can be used by a disk device driver to control the input/output (I/O) flow to the storage device.

In a multipath configuration environment there are multiple paths to provide I/O with the disk device driver. Since the number of I/O sent from the disk device driver to the storage device is still limited by the Queue Depth value, there can be many jobs that are queued at a disk device driver pending queue. This can cause a problem during error recovery, as the disk device driver will typically retry all the requests on the queue for some number of times (e.g., five retries per queued request). Since the pending queue could become much longer in a multipath configuration environment, this can result in a significant performance degradation during error recovery, or in worst case, the system hanging resulting in an application timeout.

In order to address this problem, a storage multipath device driver can implement Queue Depth control at its level to limit the amount of I/O sent to the disk device driver. This process can aid in solving the performance degradation problem at the level of the disk device driver during an error recovery procedure.

However, a further problem can then be introduced during normal (non-error) conditions with heavy or stress I/O at the storage multipath device driver level, especially with certain types of applications that flood very heavy I/O to a small number of storage devices. Under this condition, a large number of jobs can be enqueued at a pending queue of the storage multipath device driver, which can result in severe performance degradation and/or a system hanging event.

It can be appreciated that absent a Queue Depth limit at the storage multipath device driver level, the disk device driver can become a bottleneck in the error recovery situation. However, if the storage multipath device driver uses Queue Depth to limit I/O flow, then storage multipath device driver can become the bottleneck during normal (non-error) condition with stress I/O.

In US 2004/0,194,095 A1, "Quality of Service Controller and Method for a Data Storage System", Lumb et al. disclose that requests for each of a plurality of storage system workloads are prioritized. The requests are selectively forwarded to a storage device queue according to their priorities so as to maintain the device queue at a target queue depth. The target queue depth is adjusted in response to a latency value for the requests, where the latency value is computed based on a difference between an arrival time and a completion time of the requests for each workload. Prioritizing the requests can be accomplished by computing a target deadline for a request based on a monitored arrival time of the request and a target latency for its workload. To reduce latencies, it is said that the target queue depth may be reduced when the target latency for a workload is less than its computed latency value, and to increase throughput the target queue depth may be increased when the target latency for each workload is greater than each computed latency value.

In U.S. Pat. No. 6,636,909 B1, "Adaptive Throttling for Fiber Channel Disks", Kahn et al. disclose a method that sends a write request to a disk and, in response to receiving a queue full signal from the disk if the disk queue is full, sets a throttle value. The method is said to seek to avoid triggering a queue full status for a storage device by queueing commands that would overload the storage device in a local software disk driver queue. Since a predefined limit on command issuance is said to not be feasible, initiator devices instead must be able to recognize potential error producing situations and thereafter limit or throttle the number of commands issued. Accordingly, a method operates by sending a write request to a disk, receiving a queue full signal from the disk if the disk queue is full, and responsive to receiving the queue full signal setting a throttle value and thereafter dynamically adjusting the throttle value to maintain the storage device in a steady state.

In U.S. Pat. No. 6,170,042 B1, "Disc Drive Data Storage System and Method for Dynamically Scheduling Queued Commands", Gaertner et al. disclose a data storage system and method of scheduling commands in which commands are stored in a command sort queue and a scheduled command queue. Commands in the command sort queue are sorted and assigned a priority. Eventually, commands in the command sort queue are transferred to the scheduled command queue, where commands in the scheduled command queue are executed without further sorting. The desired queue depth or size of the scheduled command queue is determined as a function of both the queue depth of the command sort queue and a command execution rate value indicative of the rate at which commands in the scheduled command queue are executed. The desired queue depth can be dynamically determined using the queue depth of the command sort queue and the command execution rate value as inputs to a look-up table. The data storage system is said may include a small computer system interface (SCSI) disc (or "disk") drive that executes commands from a host system.

These various U.S. Patents and the U.S. Patent Publication do not address the specific problems discussed above, and thus do not provide a solution for these problems.

SUMMARY OF THE PREFERRED EMBODIMENTS

The foregoing and other problems are overcome, and other advantages are realized, in accordance with the presently preferred embodiments of these teachings.

In accordance with a computer program product, apparatus and a method there is provided a redundant network wherein a host computer operates with at least one storage device by monitoring conditions of the multipath storage network and controlling a storage multipath device driver in conjunction with an associated storage multipath device input/output (I/O) pending queue to increase I/O throughput to a storage device driver, such as a disk device driver, when I/O demand increases, and to decrease I/O throughput to the storage device driver in the event of an I/O error condition.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
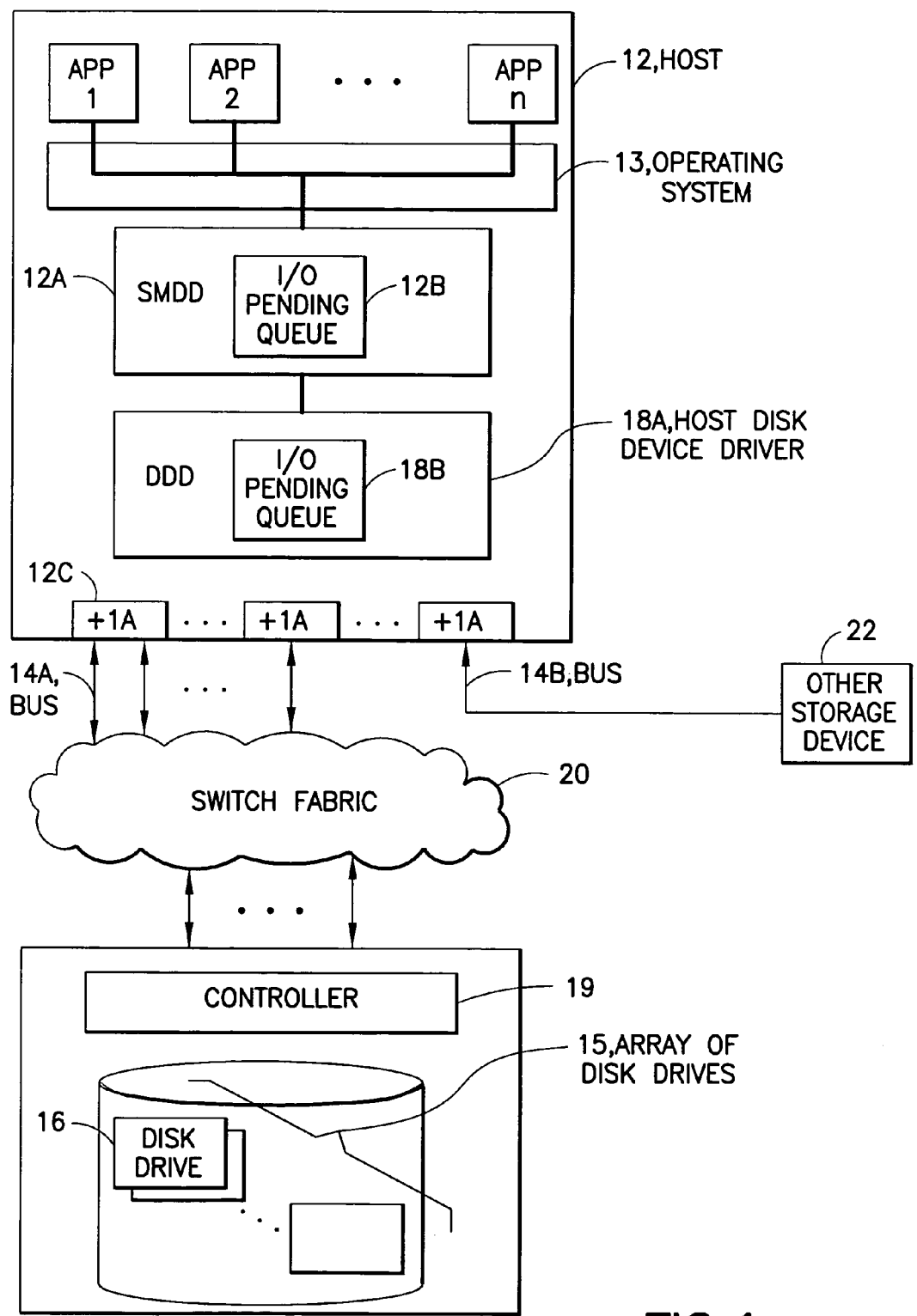
FIG. 1 is a block diagram of a Storage Area Network (SAN) system that is suitable for practicing this invention.

FIG. 1 is a block diagram of a Storage Area Network (SAN) system 10 that is suitable for practicing this invention. The SAN system 10 includes a host 12 coupled to at least one storage device, such as a disk drive 16, via at least one bus, also referred to herein as a cable or data path 14. The host 12 may be a computer, such as a mainframe computer, a workstation, a personal computer, or any type of computing device. The disk drive 16 may in practice comprise a plurality of disk drives, such as an array of disk drives 15, and may be embodied as a Redundant Array of Inexpensive Disks (RAID). There may be a disk drive controller 19 having overall responsibility for storing data in and reading data from the disk drives 16. The path 14 may be a Fiber Channel (FC) type bus, and may implement a SCSI-type of interface. The exact nature of the path 14 and/or the specifics of the path protocol are not germane to the practice of the exemplary embodiments of this invention.

For the purposes of describing the exemplary embodiments of this invention the host 12 is assumed to include a storage multipath device driver (SMDD) 12A that operates with a storage multipath device I/O pending queue 12B. The host 12 is further assumed to include a disk device driver (DDD) 18A that operates with a disk device driver I/O pending queue 18B.

One or both of the storage multipath device driver 12A and disk device driver 18A can be implemented using a data processor that executes a stored software program, or with hardware logic elements, or with a combination of software programs and hardware logic elements. The I/O pending queues 12B and 18B may be implemented using read/write memory of any suitable type, such as semiconductor random access memory (RAM).

The host 12 may be assumed to include or be coupled to at least one application (APP), and more typically a plurality of applications (APP1, APP2, . . . , APPn), at least some of which perform disk-based I/O via the storage multipath device driver 12A. Typically the storage multipath device driver 12A is coupled to the applications (APP1, APP2, . . . , APPn) via an operating system 13.

For the purposes of this invention the bus 14 may be considered to a path, and in practice there may be a plurality of paths (i.e., multipaths) between the host 12 and the storage devices. This can be implemented using at least one host adapter (HA) 12C coupled to at least two paths and to a switching fabric 20 from which multiple paths emanate to the storage devices. The use of multiple paths between the host 12 and the storage devices provides redundancy and avoids the generation of a single point of failure (POF). Through the use of the plurality of paths 14 the SAN 10 may be considered to be a redundant SAN. The storage multipath device driver 12A is assumed to have knowledge of the operational status of the various paths 14 connecting the host 12 to the storage devices 16. Another HA 12C can be used to couple to another storage device or devices 22 either directly or via another switch fabric (not shown).

By example, there may be ten storage device LUNs (Logical Unit Numbers), each a disk drive, and there may be eight paths 14 to each LUN.

In accordance with exemplary embodiments of this invention the problems discussed above are solved by the addition of intelligence into the workload management at the level of the storage multipath device driver 12A. As opposed to using a constant depth of the I/O pending queue 12B, regardless of the workload change, the storage multipath device driver 12A dynamically adjusts the amount of I/O sent to the disk device driver 18A depending on the change of workload. This technique aids in balancing the size of the storage multipath device driver I/O pending queue 12B, as well as the disk device driver I/O pending queue 18B, under various conditions of normal (non-error) operation and error recovery operation.

By the use of the exemplary embodiments of this invention the I/O throughput is increased when demand from the application(s) is increasing, thus avoiding performance degradation and preventing system hanging caused by the queue depth control implemented by the storage multipath device driver 12A. In the event of an I/O failure, the storage multipath device driver 12A is sensitive to the change and effectively "tunes" the amount of I/O sent to the disk device driver 18A to a smaller value to prevent I/O hanging or performance degradation at the level of the disk device driver 18A, as it would typically retry some number of times for each I/O request.

At the level of the storage multipath device driver 12A multiple retries are not performed to the same degree (if at all) as the disk device driver 18A for each job queued at the I/O pending queue 18B. Once a particular path 14 receives some certain number of continuous errors it is taken offline. If all the paths 14 are taken offline, the storage multipath device driver 12A may return all of the I/O requests on the I/O pending queue 12B to the application(s), without any retries. Therefore, the storage multipath device driver 12A does not typically encounter the same performance degradation during an error recovery procedure as the disk device driver 18A does.

By adding intelligence in the storage multipath device driver 12A it becomes capable of dynamically sensing and responding to a changing I/O volume, and to an occurrence of I/O errors, so as to efficiently handle both normal or good conditions and error conditions. The non-limiting embodiments of this invention can be practiced with any storage multipath device driver on any platform through the use of the Queue Depth of the I/O queue 12B to dynamically control I/O flow.

For the implementation of the exemplary embodiments of this invention a set of rules is established to control the I/O flow in order to avoid performance degradation and/or system hanging during stress I/O and/or error recovery. The set of rules are established in consideration of at least the following elements:

(a) a Queue Depth value recommended by the storage device controller 19 (e.g., the controller of the disk drive(s) 16);

(b) a Length of the storage multipath device driver I/O pending queue 12B (where all unprocessed I/O requests are queued) when the storage multipath device driver 12A begins to experience a performance degradation during a stress I/O (high volume) condition;

(c) a Length of the disk device driver I/O pending queue 18B when disk device driver 18A begins to experience a performance degradation during error recovery; and (d) a Factor of the Queue Depth used by the storage multipath device driver 12A to control the I/O flow to disk device driver 18A when a performance degradation begins to be experienced during error recovery.

Figure 2:
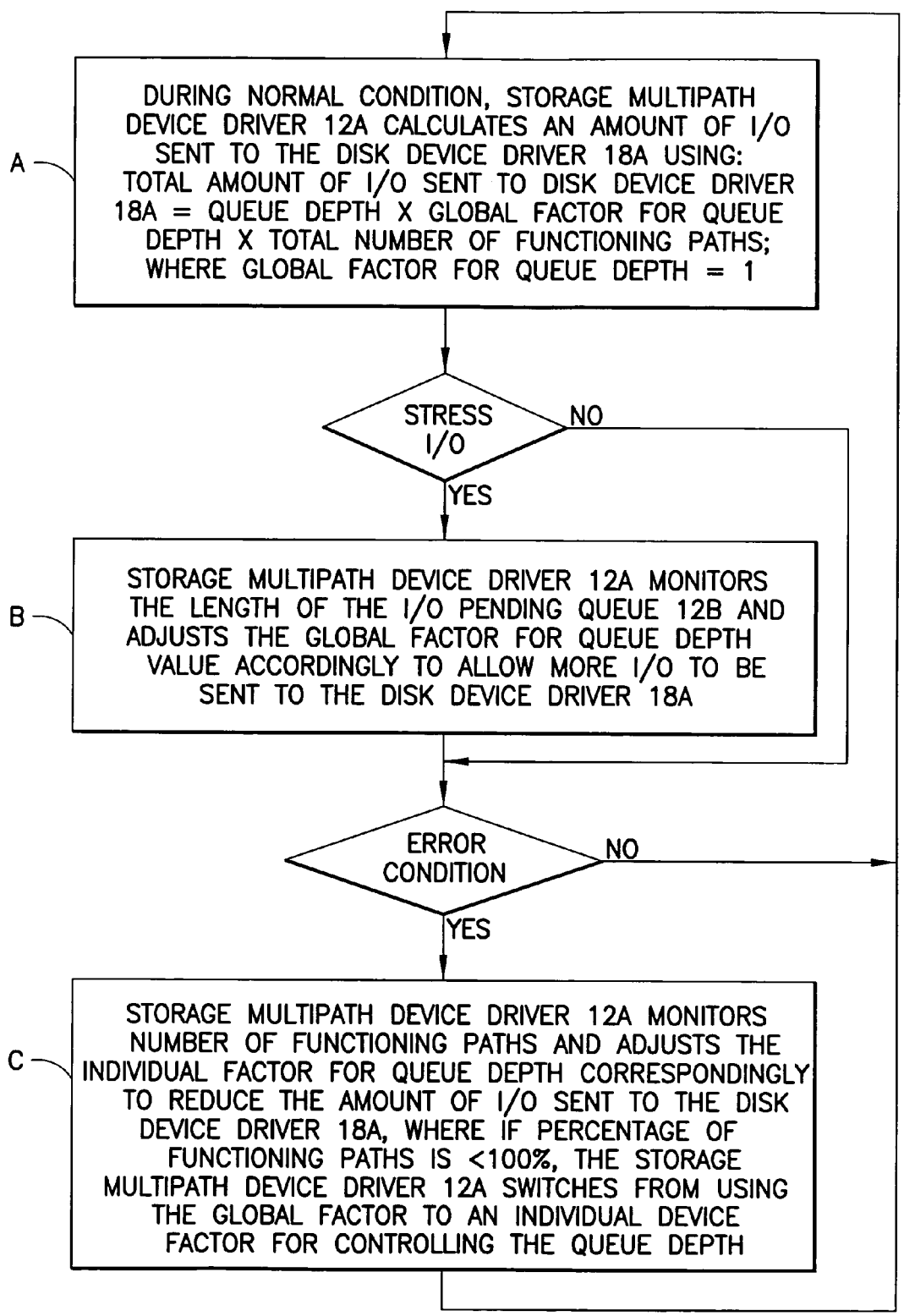
FIG. 2 is a logic flow diagram that illustrates a method in accordance with exemplary embodiments of the invention.

After determining the above elements, the storage multipath device driver 12A uses these elements to implement the following logic. Reference is also made to the logic flow diagram of FIG. 2.

During a normal condition, at Block A the storage multipath device driver 12A calculates an amount of I/O sent to the disk device driver 18A using the following formula:

Total amount of I/O sent to disk device driver 18A on a device=Queue Depth×Global Factor for Queue Depth×Total Number of Functioning Paths;

where the Global Factor for Queue Depth=1. Note that the Global Factor for Queue Depth is preferably a factor of the Queue Depth value used by all of the multipath storage devices 16.

The "normal condition" may be considered to be one where there is absence of stress I/O and/or an error condition. As employed herein "stress I/O" may be considered to be an amount of application initiated storage device activity that exceeds a normal amount of activity by some predetermined amount. The predetermined amount may be fixed, or it may be variable depending on system conditions. For example, on an AIX™ operating system 13 equipped host 12 system (AIX™ is an open operating system, based on UNIX™, that is available from the assignee of this patent application), the following table defines a suitable rule for this implementation (n is the number of I/O requests):

| Length of Pending Queue | Global Factor for Queue Depth (for all storage devices) |
| --- | --- |
| n >= 1200 | 3 |
| 800 < n < 1200 | 2 |
| n < 800 | 1 |

For example, if the number of I/O requests on the I/O pending queue 12B is 1100, the calculation performed by the storage multipath device driver 12A using the formula recited above uses a value of 2 for the Global Factor for Queue Depth.

In the stress I/O environment, and at Block B, the storage multipath device driver 12A monitors the length of the I/O pending queue 12B and adjusts the Global Factor for Queue Depth value accordingly to allow more I/O to be sent to the disk device driver 18A.

In the error condition, at Block C, the storage multipath device driver 12A monitors the number of functioning paths and adjusts the individual factor for Queue Depth correspondingly to reduce the amount of I/O sent to the disk device driver 18A. If a percentage of functioning paths of a multipath device (referred to herein as m) is reduced to less than 100%, the storage multipath device driver 12A switches from using the global factor for normal or stress I/O conditions to an individual factor of this disk 16 for controlling the queue depth during the error condition.

For example, and assuming again the non-limiting case of an AIX™ operating system 13 installed on the host 12, the following illustrates a suitable rule for use in the implementation:

if 50%<m<100%, then the Individual Factor for Queue Depth (per multipath device), denoted as (f), is given by:

If Global Factor for Queue Depth>=2, $f$=Global Factor for Queue Depth−1;

else
if m<=50%, then f=1.

For example, assume in an exemplary case that the total number of paths to the storage devices 16 is eight, that the number of functioning paths is six, and that the global factor for queue depth is three. In this case the condition of 50%<m<100% is satisfied. Therefore, the following calculation is performed by the storage multipath device driver 12A:

Total amount of I/O sent to disk device driver 18A=Queue Depth×(Global Factor for Queue Depth−1) ×Total number of functioning paths.

Based on the foregoing discussion it should be appreciated that by implementing the described methods in the storage multipath device driver 12A, the storage multipath device driver 12A is enabled to dynamically adjust the I/O flow to the disk device driver 18A based on the workload and the presence or absence of I/O errors to avoid performance degradation or system hanging in stress I/O and in error conditions.

A feature of the exemplary embodiments of this invention is that the bandwidth between the host 12 and the storage devices 16 can be adjusted corresponding to I/O conditions to avoid the generation of a bottleneck at either the storage multipath device driver 12A or the disk device driver 18A.

A further feature of the exemplary embodiments of this invention is that overloading of the storage multipath device driver 12A is avoided during non-error conditions (including during stress I/O conditions), and the overloading of the disk device driver 18A is avoided during error conditions.

The foregoing description has provided by way of exemplary and non-limiting examples a full and informative description of the embodiments of this invention. However, various modifications and adaptations may become apparent to those skilled in the relevant arts in view of the foregoing description, when read in conjunction with the accompanying drawings and the appended claims. For example, while the storage devices have been described as the disk drives 16 coupled to the disk device driver 18A, in other embodiments other types of storage devices may be used, such as tape storage devices and semiconductor memory-based storage devices. The DDD 18A may thus be referred to more generally as a storage device driver, and the associated I/O queue 18B as a storage device driver I/O pending queue. Further, the disk drives 15 may be based on magnetic technology, or on optical technology, and may use fixed or removable storage medium. Still further, it can be appreciated that the SMDD 12A may be responsive to a plurality of different error conditions, such as errors arising in one or more of the disk drives 16, disk drive controller 19, the switch fabric 20 and/or the HA 12C. Further in this regard the error condition processing performed by the SMDD 12A may be tailored, if desired, in accordance with the source of the error and may thus be adaptive in nature. However, all such modifications of the teachings of this invention will still fall within the scope of the embodiments of this invention.

Furthermore, some of the features of the embodiments of this invention may be used to advantage without the corresponding use of other features. As such, the foregoing description should be considered as merely illustrative of the principles, teachings and embodiments of this invention, and not in limitation thereof.

What is claimed is:

1. A memory storing a software program that when executed by a data processor results in operations comprising:

monitoring operation of a redundant storage network; and controlling a storage multipath device driver in conjunction with an associated storage multipath device input/output (I/O) pending queue to increase I/O throughput to a storage device driver when I/O demand increases, and to decrease I/O throughput to the storage device driver in the event of an I/O error condition;

where, during a normal I/O operating condition, controlling the storage multipath device driver comprises calculating an amount of I/O sent to the storage device driver in accordance with an expression:

total amount of I/O sent to the storage device driver is equal to a queue depth times a global factor for the queue depth times a total number of functioning paths, where the global factor for the queue depth is equal to 1.

2. The memory storing the software program as in claim 1 where, during a stress I/O operating condition, controlling the storage multipath device driver comprises monitoring a length of the I/O pending queue and adjusting the global factor for queue depth value accordingly to allow more I/O to be sent to the storage device driver.

3. The memory storing the software program as in claim 1 where, during an error condition, controlling the storage multipath device driver comprises monitoring a number of functioning paths and adjusting an individual factor for queue depth correspondingly to reduce the amount of I/O sent to the storage device driver, where if a percentage of functioning paths is reduced to less than 100%, the storage multipath device driver switches from using the global factor for queue depth value to an individual factor of a storage device for controlling I/O pending queue depth.

4. The memory storing the software program as in claim 1, where the at least one storage device comprises a disk storage device.

5. A system comprising a redundant storage network that includes a host coupled via a plurality of paths to at least one storage device, said host comprising a storage multipath device driver coupled with a storage multipath device input/output (I/O) pending queue that is coupled to a storage device driver comprised of a storage device driver I/O queue, said storage multipath device driver operable for monitoring conditions of the redundant storage network to increase I/O throughput to the storage device driver when I/O demand increases, and to decrease I/O throughput to the storage device driver in the event of an I/O error condition;

where, during a normal I/O operating condition, the storage multipath device driver calculates an amount of I/O sent to the storage device driver in accordance with an expression:

total amount of I/O sent to the storage device driver is equal to a queue depth times a global factor for the queue depth times a total number of functioning paths, where the global factor for the queue depth is equal to 1.

6. The system as in claim 5 where, during a stress I/O operating condition, the storage multipath device driver monitors a length of the I/O pending queue and adjusts the global factor for queue depth value accordingly to allow more I/O to be sent to the storage device driver.

7. The system as in claim 5 where, during an error condition, the storage multipath device driver monitors the number of functioning paths and adjusts an individual factor for queue depth correspondingly to reduce the amount of I/O sent to the storage device driver, where if a percentage of functioning paths is reduced to less than 100%, the storage multipath device driver switches from using the global factor for queue depth value to an individual factor of a storage device for controlling I/O pending queue depth.

8. The system as in claim 5, where the at least one storage device comprises a disk storage device.

9. A host comprising a multipath interface for coupling via a plurality of paths to at least one storage device, said host comprising a storage multipath device driver comprising a storage multipath device input/output (I/O) pending queue, said storage multipath device driver coupled to a storage device driver that comprises a storage device driver I/O queue, said storage multipath device driver operable to increase I/O throughput to the storage device driver when I/O demand increases, and to decrease I/O throughput to the storage device driver in the event of an I/O error condition;

where, during a normal I/O operating condition, the storage multipath device driver calculates an amount of I/O sent to the storage device driver in accordance with an expression:

total amount of I/O sent to the storage device driver is equal to a queue depth times a global factor for the queue depth times a total number of functioning paths, where the global factor for the queue depth is equal to 1.

10. The host as in claim 9 where, during a stress I/O operating condition, the storage multipath device driver monitors a length of the I/O pending queue and adjusts the global factor for queue depth value accordingly to allow more I/O to be sent to the storage device driver.

11. The host as in claim 9 where, during an error condition, the storage multipath device driver monitors the number of functioning paths and adjusts an individual factor for queue depth correspondingly to reduce the amount of I/O sent to the storage device driver, where if a percentage of functioning paths is reduced to less than 100%, the storage multipath device driver switches from using the global factor for queue depth value to an individual factor of a storage device for controlling I/O pending queue depth.

12. The host as in claim 9, where the at least one storage device comprises a disk storage device.

* * * * *